(12) United States Patent
Chu

(10) Patent No.: US 6,824,871 B2
(45) Date of Patent: Nov. 30, 2004

(54) SUBCOAT FOR POLY (P-PHENYLENE-2,6-BENZOBISOXAZOLE) FIBERS

(75) Inventor: Judy Chu, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/294,064

(22) Filed: Nov. 14, 2002

(65) Prior Publication Data

US 2004/0096658 A1 May 20, 2004

(51) Int. Cl.⁷ ............................ D02G 3/00; B32B 27/34
(52) U.S. Cl. ...................... 428/395; 428/375; 428/383; 428/295.1; 156/166; 156/910
(58) Field of Search ................................ 428/395, 375, 428/378, 383, 295.1; 156/166, 910

(56) References Cited

U.S. PATENT DOCUMENTS

| | | | |
|---|---|---|---|
| 5,595,284 A | * | 1/1997 | Takahashi et al. .......... 198/847 |
| 5,874,152 A | | 2/1999 | Middelman |
| 6,077,606 A | | 6/2000 | Gillick |
| 6,453,960 B1 | * | 9/2002 | Kondo et al. ................ 152/451 |
| 6,500,531 B2 | * | 12/2002 | Manabe et al. ........... 428/295.1 |
| 2001/0004491 A1 | * | 6/2001 | Manabe et al. ........... 428/295.1 |
| 2002/0048671 A1 | * | 4/2002 | Manabe et al. ........... 428/295.1 |
| 2002/0142147 A1 | * | 10/2002 | Sogabe et al. ............ 428/295.1 |

* cited by examiner

Primary Examiner—Rena Dye
Assistant Examiner—J. Gray
(74) Attorney, Agent, or Firm—Bruce J. Hendricks; Alfred D. Lobo; Henry C. Young, Jr.

(57) ABSTRACT

Poly(p-phenylene-2,6-benzobisoxazole) ("PBO") yarn or cord is first coated with a subcoat of a mixture of (a) an aliphatic polyglycidyl ether having a flash point greater than 150° C. with enough OH-groups to be substantially water-soluble and (b) a vinyl pyridine-styrene-butadiene rubber latex (VPSBRL), then coated in a conventional RFL dip, yields a twice-coated PBO yarn; this yarn provides adhesive strength in sulfur-vulcanizable rubber which is substantially the same as, or better than, that provided by aramid yarn having the same physical dimensions and construction, and coated with an aromatic polyglycidyl ether.

15 Claims, No Drawings

US 6,824,871 B2

SUBCOAT FOR POLY (P-PHENYLENE-2,6-BENZOBISOXAZOLE) FIBERS

FIELD OF THE INVENTION

This invention relates to (A) multifilament poly(p-phenylene-2,6-benzobisoxazole) ("PBO") yarn or cord which is coated with a mixture of an epoxy resin with a vinyl pyridine-styrene-butadiene rubber latex (VPSBRL), the mixture referred to as a "subcoat"; the subcoated cord is then again coated by dipping in a conventional reaction product of a phenolic compound, an aldehyde donor and a latex, familiarly referred to generically as a "resorcinol-formaldehyde latex (RFL)"; and, (B) to a PBO-finishing process to make twice-coated yarn, in which process the epoxy-latex mixture is applied to PBO yarn which may have been given a spin-finish, or corona, or plasma treatment, yielding subcoated PBO yarn; and, the subcoated yarn is then again coated by dipping in a conventional RFL dip. The twice-coated yarn or cord has improved adhesion comparable to that provided by a coated poly(phenylenediamine terephthalamide) "aramid" yarn. Aramid is the generic name for fiber in which the fiber-forming substance is a long-chain synthetic aromatic polyamide in which at least 85% of the amide linkages are attached directly to two aromatic linkages.

BACKGROUND OF THE INVENTION

The great strength of yarn or cord made from aramid fibers which have a crystalline surface has resulted in its widespread use to reinforce a variety of rubber articles in which adhesion is of paramount importance. The inherently poor bonding of vulcanized rubber to the surfaces of aramid fibers was overcome, over many years, by using several different processes many of which rely on a polyepoxide, or "epoxy" for brevity, subcoat followed by a RFL dip.

PBO yarn has higher strength and could deliver better performance than aramid yarn in reinforced tires, conveyor belts, drive belts and the like, if the inherently poor adhesive characteristics of the PBO yarn, due to low chemical reactivity and rigid surface structure, could be overcome. The outstanding flame resistance and thermal stability of the yarn is ideally suited for the manufacture of heat-resistant fabrics used to make high-pressure high-temperature resistant hose and protective clothing.

Because PBO fiber has a tensile modulus ($T/mm^2$) nearly twice as high as that of aramid fiber it was believed that PBO yarn was ideally suited for use in reinforced sulfur-vulcanizable rubber if the yarn could be successfully coated with a coating which exhibited a comparable or better adhesion for rubber than which has been already achieved in aramid yarn.

The Problem

The surface characteristics of PBO yarn and the filaments from which it is made, are such that it is difficult to obtain substantially the same degree of adhesion with rubber as is currently obtained with aramid yarn. Of the many epoxy resins with which aramid, and some polyester yarns, may be effectively subcoated before each is topcoated with a conventional RFL dip, the aromatic polyglycidyl ethers are not sufficiently effective with PBO yarn. A subcoat for PBO yarn is to be found which has substantially the same adhesion to sulfur-vulcanized rubber as does successfully subcoated aramid yarn.

It is well known that an epoxy resin, both aliphatic and aromatic polyglycidyl ethers, is a highly effective subcoat for aramid fibers and it is unnecessary to combine the epoxy resin with a rubber latex of any kind. Moreover, as will be seen in Tables IV and V below for reinforcement by embedding and bonding twice-coated cord in the same two rubber compounds used in belts or plies, it was found that addition of a nitrile-butadiene rubber ("NBR") latex to either an aliphatic or an aromatic polyglycidyl ether used in a subcoat for PBO cord, failed to provide adhesion comparable to that provided without the NBR latex in aramid cord.

Since it is also known that epoxy resins could be reinforced with PBO fibers as disclosed in U.S. Pat. No. 5,874,152 to Middelman, an obvious choice was to use an epoxy resin as a subcoat. However, as will be evident from tests presented hereafter, several epoxy resins provided reasonably good adhesion in sulfur-vulcanizable rubber when used as subcoats, followed by a RFL dip, but the adhesion to PBO yarn was far from a close match compared to the adhesion provided by aramid cord in sulfur-vulcanizable rubber. Not unexpectedly, it was found that aliphatic polyglycidyl ethers which are effective only in combination with a VPSBRL on PBO yarn, were also effective without the latex, on aramid fibers.

It is known, as disclosed in U.S. Pat. No. 6,077,606 to Gillick et al, that carbon yarn may be used to reinforce a rubber composition comprising VPSBRL in combination with resorcinol, formaldehyde and an acrylonitrile-butadiene copolymer, if the yarn is first impregnated with an aliphatic epoxy resin, but there was no reason to believe that the combination of the VPSBRL with the epoxy resin would provide an effective subcoat for the carbon yarn, or for any other yarn.

Rubber articles designed to withstand high stresses in use are typically reinforced with substantially inextensible yarn or cord derived from filamentary polyester, nylon, glass, graphite, ultra high molecular weight (UHMW) polyethylene, polypropylene, polyvinyl alcohol, aramid and the like, the last named being the current material of choice for high-performance rubber hose, belts, and tires, inter alia. In such articles, it is essential that the yarn or cord be firmly adhered, preferably cohesively bonded, to the rubber and remain effectively adhered even after the article has been repeatedly subjected to strains varying by orders of magnitude in use, because any separation and relative movement of the rubber and yarn or cords leads to abrasion therebetween and failure. When cord or yarn is cohesively bonded to rubber, pulling the yarn or cord out of the rubber results in the rubber being torn away so that it covers a major portion of the surface of the yarn or cord. Twice-coated PBO yarn is particularly desirable for reinforcing conveyor belts, drive belts and any of the rubbery portions of a tire, especially the tread and breaker plies.

SUMMARY OF THE INVENTION

PBO yarn from filaments which may be provided with an initial spin-finish, or a corona, or a plasma treatment, is first coated with a subcoat of a mixture of a slightly water-soluble epoxy resin with a vinyl pyridine-styrene-butadiene rubber latex (VPSBRL), then coated in a conventional RFL dip, to yield a twice-coated PBO yarn; this yarn provides adhesive strength in sulfur-vulcanizable rubber which is substantially the same or better than that provided by aramid yarn having the same physical dimensions and construction, in the same application. By "slightly water-soluble" is meant that the solubility of the epoxy resin in water at 23° C. is in the range from about 1% to 15% by weight. Acceptable bonding is indicated by cohesive failure, evidenced on a scale of (0) to (5) by rubber coverage of (5), and a peel force of at least 100 Newtons.

PBO yarn or cord adapted for the reinforcement of rubber articles has a surface coated with a mixture of VPSBRL such as 2-vinyl pyridine-SBR and an aliphatic polyglycidyl ether having a flash point greater than 150° C. with only enough OH-groups to be slightly water-soluble.

Though VPSBRL, used by itself as a subcoat, has substantially the same effect as water, irrespective of the solids content of the subcoat and how much solids is deposited on the yarn, it is found that using a subcoat in which the aliphatic polyglycidyl ether (solids) relative to the VPSBRL (solids) is present in a range from 1:3 to 3:1, the VPSBRL solids preferably being present in a minor proportion by weight; when the subcoated yarn or cord is adequately topcoated with RFL, the adhesion produced is comparable to that provided by a commercially used subcoat on aramid yarn similarly topcoated; preferably the VPSBRL solids are present in the range from about 30 to 95 parts by weight per 100 parts of aliphatic polyglycidyl ether solids deposited on the PBO yarn; the total solids of the deposited subcoat is in the range from about 10 ppm to 1% by weight, based on the dry weight of the subcoated yarn.

DETAILED DESCRIPTION OF PREFERRED EMBODIMENTS

Yarn made from a polymer having a (p-phenylene-2,6-benzobisoxazole) repeating unit shown below is derived from a condensation polymerization between 4,6-diaminoresorcinol and terephthalic acid. The structure of the repeating unit is:

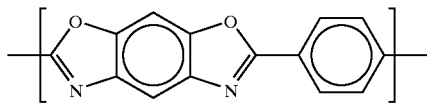

The polymer is a rigid-rod, liquid crystal polymer which has a negative thermal coefficient, that is, it expands when cooled. Additional details about the polymer and how it is made are found in the following references which are incorporated by reference thereto: Evers, Thermoxadatively Stable Articulated p-Benzobisoxazole and p-Benzobisthiazole Polymers, U.S. Pat. No. 4,359,567 (Nov. 16, 1982); Tsai et al., Method for Making Heterocyclic Block Copolymer, U.S. Pat. No. 4,578,432 (Mar. 25, 1986); 11 Ency. Poly. Sci. & Eng., Polybenzothiazoles and Polybenzoxazoles, 601 (J. Wiley & Sons 1988) and W. W. Adams et al., The Materials Science and Engineering of Rigid-Rod Polymers (Materials Research Society 1989).

A dope of the polymer is spun into high tensile strength fibers by known dry jet-wet spin techniques in which the dope is drawn through a spinneret into a coagulation bath. Well known fiber spinning and coagulation techniques produce fibers or filaments each of which preferably has an average diameter typically in the range from about 10 µm to 25 µm of no more than about 50 µm and more preferably no more than about 25 µm. The average tensile strength of a filament is at least 1 GPa, typically more than 2.75 GPa, preferably at least 4.10 GPa. Multiple filaments, from 100 to about 100,000, are then woven into twisted or untwisted yarn, which in turn, is woven into cord.

The optimum denier of the yarn varies depending upon the desired use, typically being in the range from about 50 to 1000 the particular range for tire cord being chosen depending upon the particular tire and where it is to be reinforced. The yarn may be given an additional corona or plasma treatment and lubricated with an oil and provided with an antistatic agent.

Properties of two representative PBO cords are presented in the Table below:

|  | PBO-HM | PBO-AS |
| --- | --- | --- |
| Construction | 1100 dtex/2 | 1100 dtex/2 |
| Twist cable, tpm | 362 | 364 |
| Twist ply, tpm | 357 | 357 |
| Tensile strength, N | 503 | 436 |
| Elong. @ break | 3.9 | 4.6 |
| Load @ 1%, N | 38.8 | 30.4 |

Various modifications of subcoatings which included an epoxy resin have been tested on the PBO yarn and only a substantially water-soluble aliphatic epoxy resin having a flash point greater than 150° C. in combination with a vinyl-pyridine-SBR latex (VPSBRL) gave adhesive strengths which closely matched those provided by aramid cord in sulfur-vulcanizable rubber. It is believed that other copolymerizable pyridyl monomers which have a substituent with a reactive double bond will yield results comparable to those obtained with a vinyl-substituent, but the latter is commercially readily available and is the substituent of choice.

Particularly since an epoxy, whether aromatic or aliphatic, is not combined with any latex when aramid or polyester yarn is coated for commercial applications, and each has essentially the same effect on aramid cord (see Example 4 below) there was no reason to look to a combination of any particular epoxy with a latex for a subcoat for PBO yarn. Further, since the effect of a NBR latex in combination with a commonly currently used aromatic epoxy did not improve adhesion provided by the epoxy alone (see Example 6 below), there was no reason to look to combining an aliphatic glycidyl ether with any latex, much less a vinyl pyridine-styrene-butadiene latex. The effectiveness of the aliphatic polyepoxide and the VPSBRL was particularly unexpected because the VPSBRL, by itself as a subcoat, regardless of how much solids it contained, provided so little adhesion (not much better than water alone), on either yarn, as to merit it use being eliminated promptly. Yet, depositing a subcoat in which as little as from about 5 ppm to 300 ppm of VPSBR solids are present, from less than 2% of subcoat solids, provided excellent results on PBO yarn.

Rubbery aqueous alkaline vinyl pyridine copolymer latices are well known. See U.S. Pat. Nos. 2,561,215; 2,615,826; 3,437,122 and 4,145,494. They comprise a copolymer of about 50 to 95% by weight of butadiene-1,3, 5 to 40% by weight of a vinyl pyridine, and 0 to 40% by weight of a vinyl aromatic compound like styrene. Examples of suitable vinyl pyridines are 2-vinyl pyridine, 4-vinyl pyridine, 2-methyl-5-vinyl pyridine and 5-ethyl-2-vinyl pyridine. It is usually preferred to use a latex of a terpolymer of about 60 to 80% by weight of a butadiene-1,3, about 7 to 32% by weight of styrene and from about 4 to 22% by weight of 2-vinyl pyridine. Even more preferred is a terpolymer of about 70% by weight of butadiene-1,3, 15% styrene and 15% 2-vinyl pyridine. Part of the vinyl pyridine copolymer may be replaced with a rubbery butadiene-styrene copolymer and/or a rubbery polybutadiene so long as the relative ratios between the butadiene-1,3 vinyl pyridine and styrene remain as set forth above.

The rubbery vinyl pyridine copolymer and the rubbery polybutadiene or rubbery butadiene copolymer are made in water using free radical catalysts, chelating agents, modifiers, emulsifiers, surfactants, stabilizers, short stopping agents and so forth. They may be hot or cold polymerized, and polymerization may or may not be carried to abut 100% conversion. If polymerizations are carried out with appropriate amounts of chain transfer agents or modifiers and conversions are stopped below 100% conversion, low or no gel polymers are possible. Free radical aqueous emulsion polymerization is well known as shown by: (1) Whitby et al, "Synthetic Rubber," John Wiley & Sons, Inc., New York, 1954; (2) Schildknecht, "Vinyl and Related Polymers," John Wiley & Sons, Inc., New York, 1952; (3) "Encyclopedia of Polymer Science and Technology," Interscience Publishers a division of John Wiley & Sons, Inc., New York, Vol. 2 (1965), Vol. 3 (1965), Vol. 5 (1966), Vol. 7 (1967) and Vol. 9 (1968) and (4) Bovey et al., "Emulsion Polymerization," Interscience Publishers, Inc., New York, 1955.

Examples of slightly water-soluble polyepoxides are polyethylene glycol diglycidyl ether, glyceryl diglycidyl ether, diglyceryl diglycidyl ether, diglyceryl triglycidyl ether, trimethylolpropane polyglycidyl ether, pentaerythritol polyglycidyl ether and sorbitol polyglycidyl ether. Less water-soluble but still usable polyepoxides include triglycidyl isocyanurate; 1-epoxyethyl-3,4-epoxycyclohexane; vinyl cyclohexene dioxide; ethylene glycol diglycidic ether; 1,2-propanediol diglycidic ether; 1,3-propanedioldiglycidic ether; 1,3-butanedioldiglycidic ether; 1,4-butanediol diglycidic ether; 2,3-butanediol-diglycidic ether; and the glycidyl ethers of glycerol, erythritol, pentaerythritol, and sorbitol which contain two to three glycidic groups per molecule, for example, the diglycidyl ether of diglycerol, the triglycidyl ether of hexanetriol and so forth.

Aramid yarn used in this and following examples is in the form of cord, 1100 dtex/2, 9×9 tpi (or 354×354 tpm) obtained from DuPont; and PBO cord having identical physical specifications as the aramid cord, which PBO cord has not been given a corona or plasma treatment, is obtained from Toyobo Co., Ltd., Japan.

A typical subcoat is prepared as follows: 1 gm of the epoxy resin is dissolved in 99 gm of water and 1 gm of the VPSBRL is added—when the VPSBRL has 41% solids, the solids content of 101 gm of solution is 1.41 gm.

In each case, cord is first passed over rolls into a dip tank containing the subcoat to be used, then dried and cured in successive zones ("first pass") in a Litzler oven having two zones, under conditions stated for each zone. The dried and cured cord is then passed a second time through the same zones under the same conditions ("second pass") so that the pick-up of solids is in the range from about 10 ppm to 1% by dry weight of the cord.

Conditions for Subcoating Cord in Litzler Oven

| Conditions | First E-Zone | | Second F-Zone | |
|---|---|---|---|---|
| Temp. ° C. (° F.) | 138 (280) | 249 (480) | 138 (280) | 249 (480) |
| Time (sec) | 60 | 60 | 60 | 60 |
| Tension control, kg (lb) | 1.7 | | 1.7 | |

The subcoat, upon drying at a temperature in the range from about 100° C. to 200° C. for from 1 to 10 min, results in the deposit of from about 10 ppm to 1% by weight, preferably from 50 ppm to 0.5%, of subcoat solids on the dried PBO yarn. This subcoat may additionally include a lubricant, such as butyl stearate, ethoxylated long chain alcohols, ethoxylated polysiloxanes and mixtures thereof, in amounts ranging from about 0 to 10% by dry weight. To facilitate application to the yarn, the subcoat is applied from an aqueous solution in which the epoxy resin is present in an amount in the range from about 0.1 to 5% by weight, and the VPSBRL is present as a latex in which the solids content ranges from about 10 to 60%.

The subcoat composition may be applied to the yarn using any suitable means which is selected primarily based on the physical form of the PBO, whether fabric or cord. Typically used are a metered applicator, a kiss roll, spray or foam, singly or in combination; whatever means is used, it is controlled to provide the requisite amount of deposit.

A preferred composition of the subcoat is a mixture of equal volumes of (i) an aqueous solution of 1% epoxy solids and (ii) VPSBRL containing from 40% to 60% solids.

Dry subcoated PBO yarn is topcoated with a water soluble thermosetting resin prepared from reactants consisting essentially of (i) a compound selected from the group consisting of phenol, resorcinol, the cresols, the xylenols, p-tert butylphenol and p-phenyl phenol and mixtures thereof; (ii) an aldehyde donor selected from the group consisting of formaldehyde, acetaldehyde, furfural, paraformaldehyde and hexamethylenetetramine and mixtures thereof; and (iii) a latex, in an amount sufficient to leave, upon drying, solids in the range from about 0.1 to 10 parts by weight dry per 100 parts of twice-coated PBO yarn.

The adhesive RFL topcoat is applied by dipping the subcoated PBO yarn prior to its incorporation into rubber, utilizing conventional techniques known to those skilled in the art of bonding yarn or cord to rubber. It will be recognized that the RFL dip may include other additives commonly employed by those skilled in the art such as, for example, triallylisocyanaurate, blocked isocyanates, active epoxy compositions, and the like. Following application of the RFL coating, the PBO yarn is heated to a temperature in the range from about 100° C. to 300° C. for from 30 sec to 2 min, and a layer of compounded rubber is applied to and cured on the twice-coated PBO yarn. The resultant cured composite is coated with the solid residue from the RFL. Information on the preparation of the water soluble thermosetting phenolic-aldehyde resins will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 22 to 52; "Formaldehyde," Walker, A.C.S. Monograph Series, Reinhold Publishing Corp., New York, N.Y., Third Edition, 1964, pages 304 to 344; and "The Chemistry of Phenolic Resins," Martin, John Wiley & Sons, Inc., New York, 1956.

For the purposes of this description, "compounded rubber" refers to the natural or synthetic rubber compositions which have been compounded with appropriate compounding ingredients such as, for example, carbon black, oil, stearic acid, zinc oxide, silica, wax, antidegradants, resin(s), sulfur and accelerator(s).

Rubber in PBO-reinforced articles for use in tire manufacture and for other purposes may be natural (Hevea, cis-1,4-polyisoprene) rubber, or synthetic rubber which is a conjugated diolefin polymer, or mixtures thereof including reclaimed rubbers. Such synthetic rubbers are polymers of butadienes-1,3, e.g. butadiene-1,3, isoprene, 2,3-dimethylbutadiene-1,3, and of mixtures thereof, and copolymers of mixtures of one or more such butadienes-1,3, with one or more other polymerizable compounds which are capable of forming rubber copolymers with butadienes-1,3.

It is readily understood by those having skill in the art that rubber compositions used in a tire would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants, reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Other components which may be present in the topcoat composition include tints, fluorescent brighteners, emulsifiers, antifoaming agents, antimicrobial compounds, co-catalysts, flexibilizers such as methacrylates and mixtures thereof. The total amount of solids (i.e., all constituents except water) in the topcoat composition typically ranges from about 1 to about 30% by weight, preferably from about 5 to about 20% by weight.

The aramid yarn or cord to which PBO is compared, is made from filaments under the trademarks "Fiber B", "Kevlar", "DP-01", and "Nomex", inter alia. The fibers are made from the condensation product of isophthalic or terephthalic acid and m- or p-phenylenediamine.

The following specific examples are given for purposes of illustration. In all instances the coated cord is the type used in the reinforcement of pneumatic tires, specifically, each cord is designated 1100 dtex/2, 9×9 tpi (or 354×354 tpm). The coated cord is wound on a "Band Builder" constructed for the purpose. A swatch of cord about 20 cm long and 5 cm wide from the Band Builder is calendered into different rubber compounds, a first one used for belts in automobile tires, referred to as "passenger tires", a second used for plies in aircraft tires, and a third used for belts in high speed automobile tires. Only the main ingredients are listed, it being understood that the compounds may contain numerous conventionally added additives such as surfactants, waxes, fatty acid salts to reduce the surface tension of the latex, oil-based or synthetic defoamers and gum or acrylate thickeners to provide desirable processing characteristics.

Main ingredients of a compound used for belts in tires of passenger automobiles are as follows:

| Ingredient | phr |
| --- | --- |
| Natural Rubber | 100 |
| Carbon Black (HAF-LS) | 52 |
| Processing Oil | 2 |
| Adhesion Promoter* | 8 |
| Accelerator | 0.75 |
| Zinc Oxide | 8 |
| Sulfur | 4 |

*hexamethoxymethylmelamine, cobalt naphthenate & resorcinol

In the tables below, the above "automobile compound" is referred to as PASSCPD.

Main ingredients of a compound used for belts in high-speed automobile tires are as follows:
non-productive composition comprising,

| Ingredient | phr |
| --- | --- |
| Natural Rubber | 50 |
| Synthetic cis-1,4-polyisoprene rubber | 50 |
| Carbon Black | 45–60 |
| Fatty Acid | 2.0 |
| Processing Oil | 1.0 |

-continued

| Ingredient | phr |
| --- | --- |
| Resorcinol | 2.0 |
| Zinc Oxide | 5.0 |
| Nylon/NAT2200 | 37.5 to 75 | and a productive composition comprising,

| | |
| --- | --- |
| Antidegradant | 0.75 |
| Zinc Oxide | 3.0 |
| Accelerators, Resin | 4.0 |
| Sulfur | 2.4 |
| Retarder | 0.1 |

In the tables below, the above compound is referred to as HSTCPD.

Main ingredients of a compound used for belts in aircraft tires, referred to as "aircraft compound", are as follows:

| Ingredient | phr |
| --- | --- |
| Natural rubber | 100 |
| Carbon black | 40–60 |
| Processing oil | 3–10 |
| Fatty acid | 1–3 |
| Zinc oxide | 3–8 |
| Sulfur | 0.5–2.5 |
| Accelerator | 1–3 |
| Adhesion promoter | 1–7 |

In the tables below, the above compound is referred to as AIRCCPD.

EXAMPLE 1

Effect of Cresol Novolac Polyglycidyl (Prior Art) Ether Subcoat

This polyepoxide is chosen for comparison because both aramid and PBO yarn have crystalline surfaces, and if this characteristic is of particular importance, the epoxy would be expected to be comparably effective. Aramid yarn or cord is subcoated with a cresol novolac polyglycidyl ether commercially available and commonly used as a subcoat of choice for aramid yarn. The same subcoat is applied to PBO yarn with the expectation that its crystalline surface might react in a manner similar to the reaction of the crystalline surface of aramid filaments. The subcoat is applied from a 1% (by weight) dispersion to provide the same pick-up of solids on each yarn. Each of the subcoated yarns is dried at 138° C. and cured at 249° C., then identically double-topcoated to provide the same amount of solids with a RFL-blocked isocyanate dip conventionally used on aramid yarn, dried and cured at 265° C. for about 0.5 min, in two successive passes, and calendered between two pads of a particular rubber in which it is to be tested, to form a composite or "sandwich" and cured.

Static adhesion is measured as "peel adhesion" by a strap peel adhesion test, ASTM D4393, in which rubber straps are pulled apart with sufficient force to separate one strap from the other. The surfaces of the cords are then examined for the amount of rubber covering them.

A hot dynamic flex test is generally similar to ASTM D4393 "strap peel adhesion test" and determines the adhesion to rubber compounds of flexed and unflexed specimens, and tensile properties of flexed and unflexed synthetic tire cords in rubber compounds.

Two layers of tire cords are successively wound, one at a time onto successive layers of rubber compound on a band building drum, and built into a pad which is cured at a specific temperature and pressure using a special mold. The cured sample is then cut into 25.4 mm strips parallel to the cords. Cords for unflexed tensiles are removed from the area adjacent the strips. The strips are then flexed under specified conditions in a Scott Compression Fatigue Tester using a 12.7 mm spindle. The two fabric layers of the strips are separated on a tensile tester and the static and dynamic adhesion values are recorded. Cords are removed from the flexed strip and from the adjacent 12.7 mm unflexed strip. Both are then tested on a tensile tester to determine retained break strength.

Stiffness and tensile strength are measured according to ASTM D885-02.

A Pullout Adhesion Test is used to determine the force required to cause failure at the cord interface, initiating at the embedded cord end. The force is measured on an Instron Model #4202.

Two cords are sandwiched between 2 pieces of rubber compound each 1.5 mm thick over 19 mm (0.75") of their length, and the rubber cured. Each cord has a mate on the opposite side of the block. Using a tensile tester, force is applied at a cross-head speed of 304.8 mm/min and recorded on a chart or PC to show failure initiating at the embedded cord end and working its way up along the cord-rubber interface of the weakest of the two mated cords. Once the cord starts to pull out, the force drops. The average of four samples is used.

Load At Specified Elongation ("LASE") is measured according to ASTM D885-02. Cords are conditioned at 24° C. and 55% relative humidity for a minimum of 6 hr before their tensile properties are measured on an Instron Model 4200 tensile tester. Gauge length is 254 mm and the cross-head speed is 304.8 mm/min. When elongated to break, the load-deflection curve produced indicates the tensile properties of the cord material.

The effect of the RFL topcoat on PBO cord without an epoxy subcoat (only dipped in water) is presented in Table I below to document the contribution of the epoxy subcoat in each case; the PBO and Aramid cord have the same physical dimensions and construction; numbers in parentheses indicate rubber coverage on a scale from 0 to 5, 5 indicating cohesive failure and 0 indicating no measurable adhesion.

TABLE I

| Test | Water on PBO | 1% ECN1400 on PBO | 1% ECN1400 on Aramid |
|---|---|---|---|
| Tensile (conditioned) | | | |
| 1% LASE, N | 48.5 | 50 | 42 |
| Break Strength, N | 551 | 561 | 354 |
| Elongation, % | 5.1 | 5.2 | 4.6 |
| Static Adhesion @ 121° C., N | | | |
| PASSCPD, 14 min/155° C. | 100 (0) | 147 (4) | 179 (5) |
| AIRCCPD, 14 min/155° C. | 148 (0) | 182 (2) | 240 (5) |
| Dynamic Flex, 2.54 cm (1") spindle, 77° C. (170° F.), 2.5 hr | | | |
| PASSCPD, adhesion, N | | | |
| Unflexed | — | 124 | 126 |
| Flexed | — | 116 | 122 |
| % Ret. tensile | — | 31 | 44 |
| AIRCCPD, adhesion, N | — | 174 | 207 |
| Unflexed | — | 172 | 199 |
| Flexed | — | 35 | 49 |
| % Ret. tensile | | | |
| Pullout adhesion, N | | | |
| PASSCPD | 119 | 133 | 156 |
| AIRCCPD | 67 | 84 | 118 |
| Stiffness, mg/end | 54 | 80 | 39 |

It is evident from the above that adhesion with a cresol novolac polyglycidyl ether as a subcoat on the PBO yarn is substantially lower than that with the same subcoat on aramid yarn.

EXAMPLE 2

Effect of Varying Ratios of Epoxy (SPGE) and Latex (VPSBRL) in the Subcoat

A 1% (by weight solids) solution in water of SPGE, commercially available as EX614B from Nagase Chemical Co., is used as a subcoat. In Table II below, the effect of varying the ratio of SPGE and VPSBRL in a subcoat are presented. In each case the pick-up of solids in the subcoat is the same, and the subcoated cord is topcoated with the same amount of solids picked up in a RFL dip, and dried.

Test 1 uses no (zero) VPSBRL in the subcoat.

Test 2 uses 1% SPGE and VPSBRL (1 gm SPGE in 99 gm water to which is added 2.33 gm of 41% solids VPSBRL, 30:70) to provide a solids weight ratio of 1:0.95 in the subcoat.

Test 3 uses 1% SPGE and VPSBRL (1 gm SPGE in 99 gm water to which is added 1 gm of 41% VPSBRL, 50:50) to provide a solids weight ratio of 1:0.41 in the subcoat.

TABLE II

| Test | 1% EX614B[1] no VPSBRL | 1% EX614B[2] (1:0.95) | 1% EX614B[3] (1:0.41) |
|---|---|---|---|
| Tensile (conditioned) | | | |
| 1% LASE, N | 48 | 48 | 50 |
| Break Strength, N | 563 | 568 | 554 |
| Elongation, % | 5.2 | 5.2 | 5.1 |
| Static Adhesion @ 121° C., N | | | |
| PASSCPD, 14 min/155° C. | 163 (4) | 161 (4) | 197 (5) |
| AIRCCPD, 14 min/155° C. | 190 (3) | 184 (2) | 206 (4) |
| Dynamic Flex, 2.54 cm (1") spindle, 77° C. (170° F.), 2.5 hr | | | |
| PASSCPD, adhesion, N | | | |
| Unflexed | 124 | — | 125 |
| Flexed | 120 | — | 116 |
| % Ret. tensile | 42 | — | 38 |
| AIRCCPD, adhesion, N | | | |
| Unflexed | 183 | — | 189 |
| Flexed | 84 | — | 188 |
| % Ret. tensile | 29 | — | 37 |
| Pullout Adhesion, N | | | |
| PASSCPD | 141 | 140 | 140 |
| AIRCCPD | 88 | 92 | 92 |
| Stiffness, mg/end | 61 | 52 | 43 |

It is evident that increasing the amount of SPGE in the ratio used in the subcoat does not provide better adhesion. Test No. 3 which uses less epoxy resin provides coverages of 5 and 4 in passenger and aircraft respectively, indicating cohesive failure.

Results comparable to those above are obtained when the VPSBRL solids in the epoxy:VPSBRL ratio is lowered to 1:0.33, or about 3:1; and when the epoxy:VPSBRL ratio is raised to 0.33:1 or about 1:3.

EXAMPLE 3
Comparison of Effects of Each of Two Aliphatic Polyglycidyl Ethers with VPSBRL on PBO Cord Two aliphatic polyglycidyl ethers, SPGE and DPGE both commercially available from Nagase Chemical Co. as EX614B and Denacol EX421 respectively, each having a flash point greater than 150° C., are used in the same amount, in each of two subcoats containing the same amount of VPSBRL solids from a 41% solids latex. In each case the same amount of solids is picked up in the subcoat, and the same amount of solids is picked up in a RFL dip. The adhesion provided is given in Table III below:

TABLE III

| Test | 1% EX614B & VPSBRL (1:0.4) | 1% EX421 & VPSBRL (1:0.4) |
|---|---|---|
| Static Adhesion @ 121° C., N | | |
| PASSCPD, 14 min/155° C. | 197 (5) | 175 (4) |
| AIRCCPD, 14 min/155° C. | 206 (4) | 190 (3) |
| HSTCPD, 14 min/155° C. | 177 (5) | 161 (5) |
| Dynamic Flex, 2.54 cm (1") spindle, 77° C. (170° F.), 2.5 hr PASSCPD, adhesion, N | | |
| Unflexed | 125 | 115 |
| Flexed | 116 | 113 |

It is evident from the foregoing that choice of the aliphatic glycidyl ether results in different values for static adhesion and dynamic flex, values for both of which are in the desired range for each.

EXAMPLE 4
Comparison of Effects of an Aliphatic and an Aromatic Polyglycidyl Ether on Aramid Cord To determine if there is a substantial difference in the effect of an aliphatic (SPGE EX614B) compared to that with an aromatic (cresol novolac ECN1400) polyglycidyl ether, each is used in the same amount in subcoats containing 1% solids without any latex to deposit the same amount of solids on each. In each case the same amount of solids is picked up in the subcoat, and the same amount of solids is picked up in a RFL dip. The results are presented in Table IV below:

TABLE IV

| Test | 1% ECN1400 | 1% EX614B |
|---|---|---|
| Static Adhesion @ 121° C., N | | |
| PASSCPD, 14 min/155° C. | 179 (5) | 176 (5) |
| AIRCCPD, 14 min/155° C. | 240 (5) | 247 (5) |
| HSTCPD, 14 min/155° C. | 171 (5) | 165 (5) |

The static adhesion is substantially the same for both epoxy subcoats with excellent rubber coverage indicating cohesive failure irrespective of whether the epoxy chosen is aliphatic or aromatic.

EXAMPLE 5
To Determine if Addition of a Nitrile Rubber (NBR) Latex to Epoxies used in Example 5 to Improve Adhesion to Aramid, would Improve Adhesion when Used on PBO Cord An aliphatic (SPGE EX614B) and an aromatic (cresol novolac ECN1400) polyglycidyl ether are each used in the same amount in subcoats containing 1% solids in combination with the same Hycar® NBR latex, 48% solids, available from BF Goodrich Chemical Co. The subcoated cords having the same pick-up of subcoat solids, are then topcoated in the RFL dip to pick up the same amount of solids, cured and calendered into two different rubber compounds. The results are presented in Table V below:

TABLE V

| Test | 1% ECN1400 + NBR (1:0.4) | 1% EX614B + NBR (1:0.4) |
|---|---|---|
| Static Adhesion @ 121° C., N | | |
| PASSCPD, 14 min/155° C. | 122 (2) | 120 (1) |
| AIRCCPD, 14 min/155° C. | 147 (1) | 136 (0) |

Comparing these results with those obtained without the latex, as set forth in Table IV above, it is evident that addition of the NBR latex diminishes the adhesion compared to that obtained without any latex.

EXAMPLE 6
To Compare Static Adhesion of Rubber to PBO Yarn Subcoated with (i) Shell Epi-Rez 5520-W60 Epoxy at Different Levels and NBR Latex, and (ii) EX614B with VPSBRL Subcoats were prepared having varying amounts of 5520-W60 epoxy and 48% solids NBR latex, and PBO yarn was dipped in each subcoat, each for less than 10 seconds, to pick up the same amount of subcoat solids. The subcoated cords are each then topcoated with the same amount of RFL solids, dried and calendered into test samples. The results are set forth in Table VI below.

TABLE VI

| Test | 1% EX614B + VSPBR (1:0.4) | 2% W60 + NBR (2:0.4) | 4% W60 + NBR (4:0.4) |
|---|---|---|---|
| Static Adhesion @ 121° C., N | | | |
| PASSCPD, 14 min/155° C. | 120 (3) | 86 (0) | 69 (0) |

It is evident from the foregoing that irrespective of the concentration of W60 epoxy in the subcoat, mixing with a NBR latex does not provide measurable rubber coating so that the static adhesion is much poorer than with the subcoat of this invention.

EXAMPLE 7
To Determine Whether PBO Yarn Could be Used in Reinforced Sulfur-vulcanizable Rubber if the Yarn was Subcoated with a Combination of Sorbitol Polyglycidyl Ether (SPGE) or Diglyceryl Polyglycidyl Ether (DPGE) in Combination with a NBR Latex (4% Solids)

A subcoat was prepared having 2% EX614B and NBR latex, 4% solids, and PBO the yarn was dipped in the subcoat as before.

TABLE VII

| Test | 1% EX614B + VSPBR (2:2.2) |
| --- | --- |
| Static Adhesion @ 121° C., N | |
| PASSCPD, 14 min/155° C. | 120 (1) |
| ALRCCPD, 14 min/155° C. | 136 (0) |

It is evident that the adhesion, as represented by the values 1 and 0 are so low as to be unacceptable.

From the above illustrative examples it is now evident that multifilament PBO yarn is twice-coated before it is used as reinforcement, first subcoating the yarn by impregnating it with a mixture of (a) a slightly water-soluble aliphatic polyglycidyl ether having a solubility in the range from about 1% to 15% by weight at 23° C., and a flash point greater than 150° C. and (b) vinyl pyridine-styrene-butadiene rubber latex, the ratio of aliphatic polyglycidyl ether solids to vinyl pyridine-styrene-butadiene rubber latex solids being in the range from 1:3 to 3:1; then, dipping the subcoated PBO yarn in a RFL composition to pick up sufficient solids to be effective to increase the adhesion of the twice-coated yarn to the rubber compound to be reinforced; and, drying the yarn at a temperature in the range from about 100° C. to 200° C.

To use the yarn as reinforcement in a belt, fabric for plies is twice-coated and dried; the fabric is then calendered into the compound of choice. Alternatively, the yarn may be twice-coated and dried, then woven into fabric and calendered into the compound of choice.

What is claimed is:

1. A multifilament poly(p-phenylene-2,6-benzobisoxazole) yarn coated with a composition consisting essentially of a mixture of (a) a slightly water-soluble aliphatic polyglycidyl ether having a solubility in the range from about 1% to 15% by weight at 23° C., and a flash point greater than 150° C. and (b) vinyl pyridine-styrene-butadiene rubber latex, the ratio of aliphatic polyglycidyl ether solids to vinyl pyridine-styrene-butadiene rubber latex solids being in the range from 1:3 to 3:1.

2. The yarn of claim 1 additionally coated with a topcoat of water soluble thermosetting resin prepared from reactants consisting essentially of (i) a compound selected from the group consisting of phenol, resorcinol, the cresols, the xylenols, p-tert butylphenol and p-phenyl phenol and mixtures thereof; (ii) an aldehyde donor selected from the group consisting of formaldehyde, acetaldehyde, furfural, paraformaldehyde and hexamethylenetetramine and mixtures thereof; and (iii) a latex in an amount sufficient to leave, upon drying, solids in the range from about 0.1 to 10 parts by weight dry per 100 parts total by weight dry yarn.

3. The yarn of claim 1 wherein the vinyl pyridine-styrene-butadiene rubber latex is chosen from a latex made with a vinyl pyridine selected from the group consisting of 2-vinyl pyridine, 4-vinyl pyridine, 2-methyl-5-vinyl pyridine and 5-ethyl-2-vinyl pyridine, and the mixture is present as solids in an amount ranging from about 10 ppm to about 1% by weight of the total weight of the yarn.

4. The yarn of claim 1 wherein the aliphatic polyglycidyl ether is selected from the group consisting of polyethylene glycol diglycidyl ether, glyceryl diglycidyl ether, diglyceryl diglycidyl ether, diglyceryl triglycidyl ether, trimethylolpropane polyglycidyl ether, pentaerythritol polyglycidyl ether and sorbitol polyglycidyl ether.

5. The yarn of claim 2 wherein the vinyl pyridine-styrene-butadiene rubber is present as a latex in which the solids content is in the range from about 10% to 60% by weight, and the solids content of aliphatic polyglycidyl ether is in the range from about 0.1% to 5% by weight.

6. The yarn of claim 5 wherein the vinyl pyridine-styrene-butadiene rubber solids are present in a minor amount by weight relative to the aliphatic polyglycidyl ether solids.

7. The yarn of claim 6 wherein the total amount of solids in the topcoat composition typically ranges from about 1 to about 30% by weight.

8. The yarn of claim 7 wherein the total amount of solids in the topcoat composition ranges from about 5 to about 20% by weight.

9. A reinforced sulfur-vulcanizable rubber composition consisting essentially of (i) compounded rubber; (ii) multifilament yarn of fibers of poly(p-phenylene-2,6-benzobisoxazole) coated with a subcoat of solids derived from a mixture of (a) a slightly water-soluble aliphatic polyglycidyl ether having a solubility in the range from about 1% to 15% by weight at 23° C., and a flash point greater than 150° C. with (b) vinyl pyridine-styrene-butadiene rubber latex; and further coated with a solid residue of a "RFL" latex derived from a water soluble thermosetting resin prepared from a reaction product of a phenolic compound and an aldehyde donor.

10. The reinforced rubber composition of claim 9 wherein the ratio of aliphatic polyglycidyl ether solids to vinyl pyridine-styrene-butadiene rubber latex solids is in the range from 1:3 to 3:1.

11. The reinforced rubber composition of claim 9 wherein the rubber is selected from the group consisting of natural rubber, conjugated diolefin polymer, synthetic rubber and mixtures thereof.

12. The reinforced rubber composition of claim 11 wherein the solids in the vinyl pyridine-styrene-butadiene rubber latex is present in a minor proportion by weight and the vinyl pyridine is selected from the group consisting of 2-vinyl pyridine, 4-vinyl pyridine, 2-methyl-5-vinyl pyridine and 5-ethyl-2-vinyl pyridine.

13. In a process for preparing multifilament poly(p-phenylene-2,6-benzobisoxazole) yarn for subsequent adhesion to sulfur-vulcanizable rubber, the improvement comprising,
coating the yarn with a subcoat consisting essentially of a mixture of (i) an aliphatic polyglycidyl ether having a solubility in the range from about 1% to 15% by weight at 23° C., and a flash point greater than 150° C. with (ii) a vinyl pyridine-styrene-butadiene rubber latex, the ratio of aliphatic polyglycidyl ether solids to vinyl pyridine-styrene-butadiene rubber latex solids being in the range from 1:3 to 3:1 to yield subcoated yarn; and,
coating the subcoated yarn with a reaction product of a phenolic compound and an aldehyde donor.

14. The process of claim 13 including again coating the yarn with a topcoat of resorcinol-formaldehyde latex.

15. The process of claim 14 wherein the resorcinol-formaldehyde latex is at least one water soluble thermosetting resin prepared from reactants consisting essentially of (i) a compound selected from the group consisting of phenol, resorcinol, the cresols, the xylenols, p-tert butylphenol and p-phenyl phenol and mixtures thereof; (ii) an aldehyde donor selected from the group consisting of formaldehyde, acetaldehyde, furfural, paraformaldehyde and hexamethylenetetramine and mixtures thereof; and (iii) a latex in an amount sufficient to leave, upon drying, solids in the range from about 0.1 to 10 parts by weight dry per 100 parts total by weight dry yarn.

* * * * *